(12) United States Patent
Kalavrouziotis et al.

(10) Patent No.: US 12,055,774 B2
(45) Date of Patent: Aug. 6, 2024

(54) SELF-ALIGNED INTEGRATED LENS ON PILLAR

(71) Applicant: Mellanox Technologies, Ltd., Yokneam (IL)

(72) Inventors: Dimitrios Kalavrouziotis, Papagou (GR); Yuri Berk, Kiryat Tivon (IL); Vladimir Iakovlev, Ecublens (CH); Elad Mentovich, Tel Aviv (IL); Tamir Sharkaz, Kfar Tavor (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 75 days.

(21) Appl. No.: 17/453,222

(22) Filed: Nov. 2, 2021

(65) Prior Publication Data
US 2023/0107350 A1     Apr. 6, 2023

(30) Foreign Application Priority Data
Oct. 4, 2021   (GR) ............................. 20210100672

(51) Int. Cl.
*G02B 6/42* (2006.01)
*B29D 11/00* (2006.01)

(52) U.S. Cl.
CPC ...... *G02B 6/4239* (2013.01); *B29D 11/00009* (2013.01); *G02B 6/4244* (2013.01)

(58) Field of Classification Search
CPC .... G02B 6/4224; G02B 6/4228; G02B 1/041; G02B 1/11; G02B 19/0014; G02B 19/0052; G02B 19/0076; G02B 3/0031; G02B 6/4204; G02B 6/4206; G02B 6/425; G02B 6/4214; G02B 6/30; G02B 6/32; G02B 6/4221; G02B 6/4227; G02B 6/3885; G02B 7/021; G02B 27/30; G02B 3/005;
(Continued)

(56) References Cited

U.S. PATENT DOCUMENTS

| | | | |
|---|---|---|---|
| 2007/0030570 A1* | 2/2007 | Jacobowitz | G02B 6/4204 430/321 |
| 2007/0194337 A1* | 8/2007 | Kondo | H01L 25/167 257/E33.059 |
| 2010/0109025 A1* | 5/2010 | Bhat | H01L 24/97 257/E33.056 |

FOREIGN PATENT DOCUMENTS

| | | | | |
|---|---|---|---|---|
| WO | WO-2018163936 A1 * | 9/2018 | | B29D 11/00326 |
| WO | WO-2021090034 A1 * | 5/2021 | | G02B 1/11 |

OTHER PUBLICATIONS

Written Opinion of WO2021090034.*
(Continued)

*Primary Examiner* — Sonya M Sengupta
(74) *Attorney, Agent, or Firm* — Moore & Van Allen PLLC; Michael M. McCraw

(57) ABSTRACT

Various embodiments provide methods for fabricating a couplable electro-optical device. An example method comprises fabricating a pillar on a substrate by forming a lens spacer portion about an electro-optical component fabricated on the substrate; and adhering unshaped lens material to an exposed surface of the pillar. The exposed surface of the pillar is disposed opposite the substrate. The example method further comprises maintaining the unshaped lens material at a reflow temperature for a reflow time to allow the lens material to reflow into a formed lens shape, and curing the lens material to form an integrated lens having the formed lens shape secured to the lens spacer portion and formed about the electro-optical component on the substrate.

20 Claims, 11 Drawing Sheets

Figure 1:
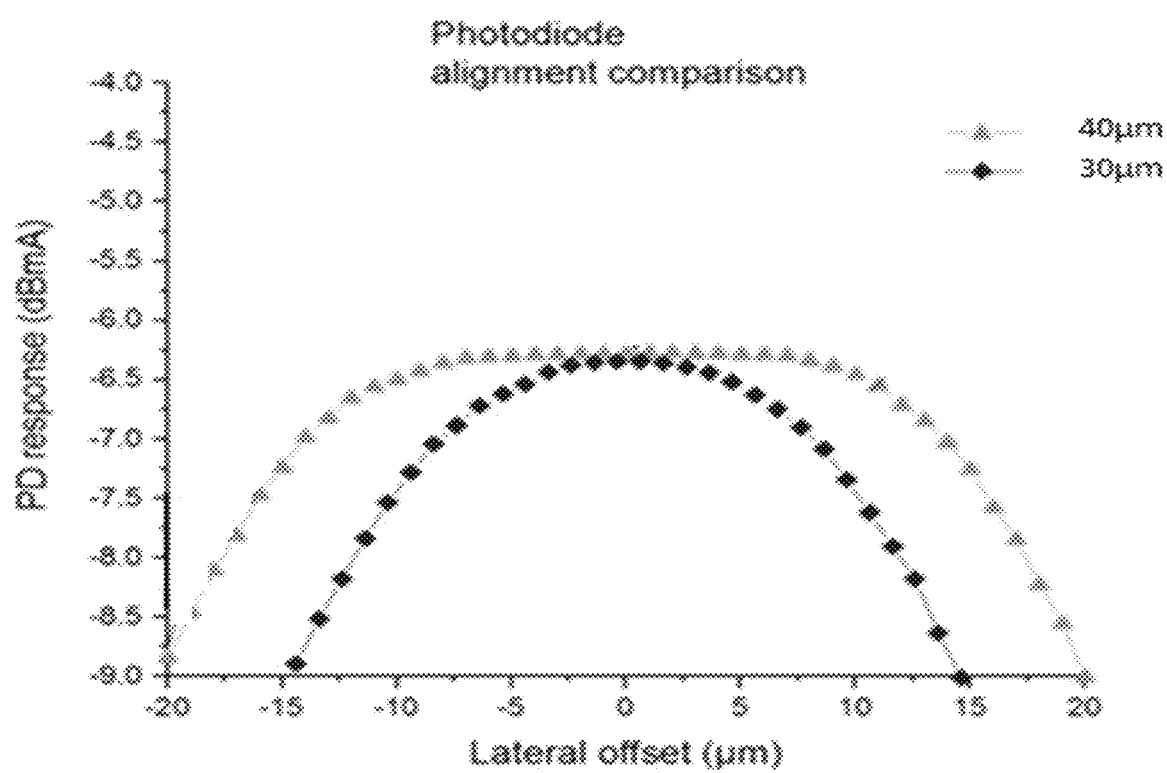

(58) Field of Classification Search
CPC .... G02B 6/262; G02B 6/3636; G02B 6/3853; G02B 7/003; G02B 7/025; G02B 7/14; G03F 7/0005; B29C 65/4845; B29C 66/73365; B29D 11/00692; H05K 1/0274; H05K 1/181; H05K 2201/10121; H05K 2203/176; H05K 3/225; H05K 3/341
See application file for complete search history.

(56) References Cited

OTHER PUBLICATIONS

Keshavarz Hedayati M, Elbahri M. Antireflective Coatings: Conventional Stacking Layers and Ultrathin Plasmonic Metasurfaces, A Mini-Review. Materials (Basel). Jun. 21, 2011;9(6):497. doi: 10.3390/ma9060497. PMID: 28773620; PMCID: PMC5456762. (Year: 2016).*

* cited by examiner

SELF-ALIGNED INTEGRATED LENS ON PILLAR

CROSS-REFERENCE TO RELATED APPLICATIONS

This application claims priority to Greek Patent Application No. 20210100672, filed Oct. 4, 2021, the content of which is hereby incorporated herein by reference in its entirety.

TECHNICAL FIELD

Various embodiments relate to an electro-optical device having a small optical window (e.g., with a diameter of less than 40 μm) and/or configured to be coupled to a small core optical fiber (e.g., having an optical fiber core in the range of 5 to 65 μm). Various embodiments relate to an electro-optical device having improved coupling characteristics.

BACKGROUND

As data communication demands increase with respect to both volume and speed, the use of electro-optical devices communicating via fiber optics has become an increasingly popular communication approach. One of the key parameters of an electro-optical device to enable higher speed is the parasitic capacitance. The lower the capacitance the higher the rate possible for the same device. The capacitance of a device is set mainly by the geometry of the device following $C=A\varepsilon/D$ where A is the device area, D is the distance between the conductive planes, and c is the dielectric constant between them. However, decreasing the device area (A) amounts to decreasing the optical window size, which, in turn, increases the coupling loss when connecting to an optical fiber. Therefore, there is a need for a more efficiently coupling of electro-optical devices having smaller optical window sizes to optical fibers.

BRIEF SUMMARY

Various embodiments provide methods for fabricating and/or manufacturing couplable electro-optical devices and/or composite electro-optical devices. In various embodiments, a couplable electro-optical device comprises an electro-optical component (e.g., a photodiode, vertical-cavity surface-emitting laser (VCSEL), and/or the like) having an integrated lens configured to aid in the coupling of the optical receiving/emitting portions of the electro-optical component and optics external to the couplable electro-optical device. In various embodiments, the electro-optical component is a small aperture electro-optical component having an optical window of 40 μm or less. In various embodiments, a composite electro-optical device is a transceiver, receiver, and/or transmitter comprising at least one couplable electro-optical device.

In various embodiments, the couplable electro-optical device is formed by fabricating a pillar on a substrate by forming a cylindrically shaped lens spacer portion about an electro-optical component fabricated on the substrate and then adhering unshaped lens material to an exposed surface of a pillar. The unshaped lens material is then formed into shaped lens material using a reflow process. The shaped lens material is cured into an integrated lens using a curing process. In various embodiments, the reflow and/or curing process(es) is performed while the electro-optical component is part of an array of electro-optical components formed on a common substrate. In various embodiments, the reflow and/or curing process(es) is performed while the electro-optical component is mounted to an optical bench, possibly having optical components attached thereto that mimic the optical path of a composite electro-optical device into which the resulting couplable electro-optical device will be installed. In various embodiments, a composite electro-optical device is at least partially assembled with the unshaped lens material adhered to the electro-optical component and the reflow and/or curing process(es) are performed while the electro-optical component is disposed within the at least partially assembled composite electro-optical device.

According to a first aspect, a method for fabricating a couplable electro-optical device is provided. In an example embodiment, the method comprises fabricating a pillar on a substrate by forming a lens spacer portion about an electro-optical component fabricated on the substrate; and adhering unshaped lens material to an exposed surface of the pillar. The exposed surface of the pillar component is disposed on an opposite side of the pillar with respect to the substrate. The method further comprises maintaining the unshaped lens material at a reflow temperature for a reflow time to allow the lens material to reflow into a formed lens shape; and curing the lens material to form an integrated lens secured to the electro-optical component on the substrate.

In an example embodiment, adhering the unshaped lens material to the exposed surface of the pillar comprises coating lens material onto a transfer medium; applying the lens material to the exposed surface; and removing the transfer medium to leave the unshaped lens material adhered to the exposed surface.

In an example embodiment, the lens material is coated onto the transfer medium using a spin coating process or a block co-polymer technique.

In an example embodiment, adhering the lens material to the exposed surface further comprises, after applying the lens material to the exposed surface and before removing the transfer medium, applying pressure on a second surface of the transfer material, the second surface of the transfer material opposite a first surface of the transfer material and the lens material coated on the first surface of the transfer material.

In an example embodiment, the pillar with the unshaped lens material adhered thereon is mounted to an optical bench during the maintaining of the unshaped lens material at the reflow temperature for the reflow time.

In an example embodiment, the optical bench is associated with one or more optical elements configured to mimic the optical path of a composite electro-optical device of which the couplable electro-optical device is configured to be a component.

In an example embodiment, at least one of the reflow time or the reflow temperature is determined based on signals generated by one or more sensors coupled to the electro-optical component.

In an example embodiment, the curing of the lens material to form the integrated lens secured to the electro-optical component on the substrate is performed while the electro-optical component is mounted to the optical bench.

In an example embodiment, the method further comprises at least partially assembling a composite electro-optical device comprising the electro-optical component within the pillar with the unshaped lens material adhered thereon and performing the maintaining of the unshaped lens material at the reflow temperature for the reflow time while the electro-optical component with the unshaped lens material adhered thereon is disposed within the at least partially assembled composite electro-optical device.

In an example embodiment, at least one of the reflow time or the reflow temperature is determined based on signals generated by one or more sensors coupled to the electro-optical component.

In an example embodiment, the curing of the lens material to form the integrated lens secured to the electro-optical component on the substrate is performed while the electro-optical component is disposed within the at least partially assembled composite electro-optical device.

In an example embodiment, the curing of the lens material comprises heating and/or maintain the lens material at a curing temperature for a curing time.

In an example embodiment, the method further comprises applying an anti-reflective coating onto an exposed surface of the integrated lens.

In an example embodiment, the pillar is one of a plurality of pillars formed on the substrate using a photolithography process, with each pillar comprising a respective electro-optical component with a lens spacer portion formed thereabout, and the unshaped lens material is adhered to a respective exposed surface of each of the plurality of pillars.

In an example embodiment, the electro-optical component has an optical window diameter of no more than 40 micrometers.

In an example embodiment, the couplable electro-optical device is configured to be coupled to an optical fiber having a core diameter in a range of 5 micrometers to 65 micrometers.

In an example embodiment, the electro-optical component type is one of a vertical cavity surface-emitting laser (VCSEL) or a photodiode sensor.

According to another aspect, a method for fabricating a couplable electro-optical device. In an example embodiment, the method comprises fabricating a plurality of pillars on a substrate by forming a plurality of lens spacer portions on the substrate with each lens spacer portion of the plurality of lens spacer portions formed about a respective electro-optical component of a plurality of electro-optical components fabricated on the substrate, wherein each pillar of the plurality of pillars comprises a respective electro-optical component of the plurality of electro-optical components on the substrate and a respective lens spacer portion of the plurality of lens spacer portions; applying lens material onto a transfer medium; applying the lens material to respective exposed surfaces of the plurality of pillars; removing the transfer medium to leave unshaped lens material adhered to the respective exposed surfaces of the pillars; maintaining the unshaped lens material at a reflow temperature for a reflow time to allow the lens material to reflow into respective formed lenses; and curing the formed lenses to form respective integrated lenses each secured to a respective electro-optical component of the plurality of electro-optical components on the substrate.

In an example embodiment, the electro-optical component with the unshaped lens material adhered thereon is mounted to an optical bench during the maintaining of the unshaped lens material at the reflow temperature for the reflow time.

In an example embodiment, the method further comprises at least partially assembling a composite electro-optical device comprising the pillar comprising the electro-optical component and the lens material in the unformed lens shape adhered thereon and performing the maintaining of the lens material at the reflow temperature for the reflow time while the pillar with the lens material adhered thereon is disposed within the at least partially assembled composite electro-optical device.

According to another aspect, a method for fabricating a couplable electro-optical device is provided. In an example embodiment, the method comprises fabricating a pillar on a substrate by forming a lens spacer portion about an electro-optical component fabricated on the substrate; adhering unshaped lens material to an exposed surface of the electro-optical component, the exposed surface of the electro-optical component being disposed opposite the substrate; mounting the electro-optical component with the unshaped lens material adhered thereon to one of (a) an optical bench or (b) an at least partially assembled composite electro-optical device; maintaining the unshaped lens material at a reflow temperature for a reflow time to allow the lens material to reflow into a shaped lens; and curing the shaped lens material to form an integrated lens secured to the electro-optical component on the substrate. The maintaining of the unshaped lens material at the reflow temperature for the reflow time and the curing of the shaped lens is performed while the electro-optical component is disposed within the one of (a) the optical bench or (b) the at least partially assembled composite electro-optical device.

BRIEF DESCRIPTION OF THE SEVERAL VIEWS OF THE DRAWING(S)

Figure 2:
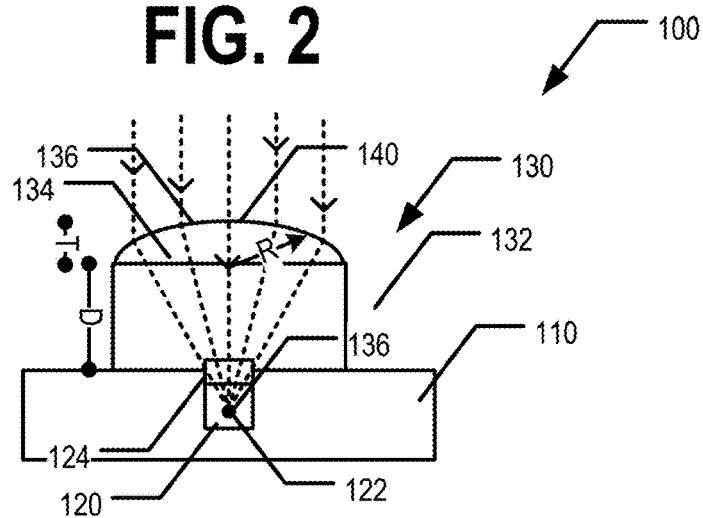
Figure 3:
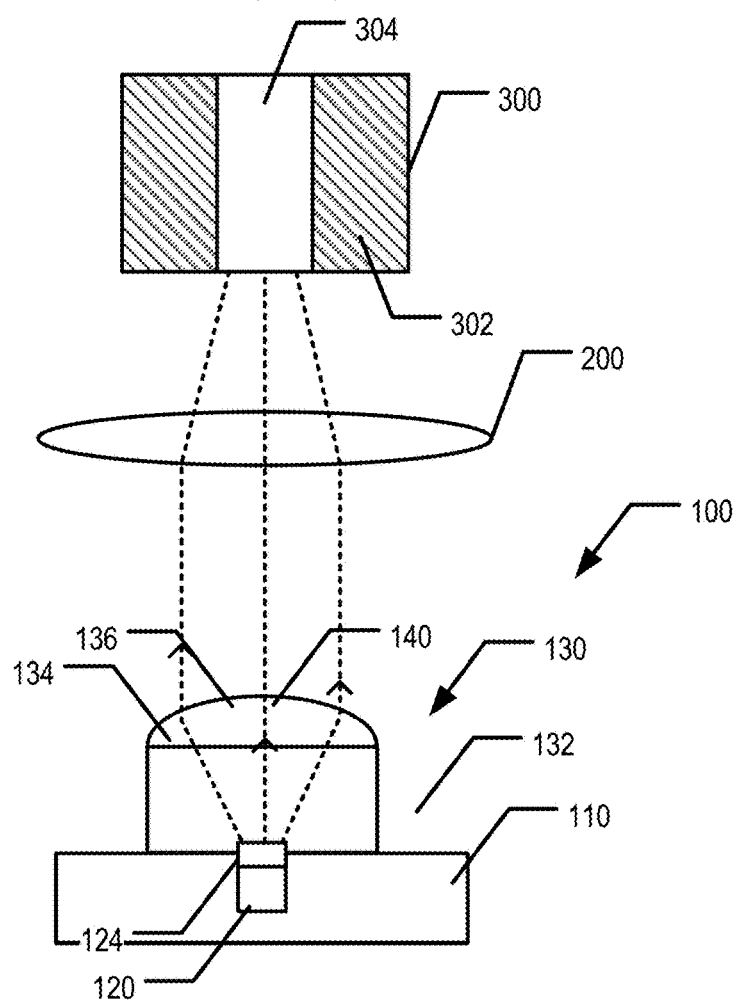
Figure 6A:
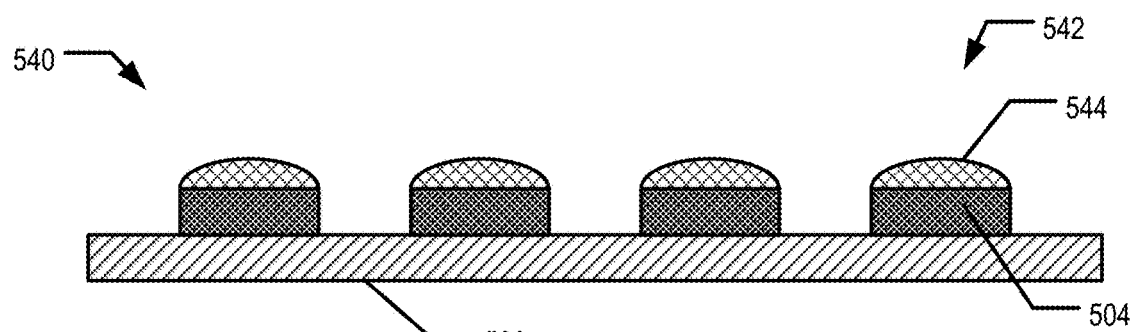
Figure 6B:
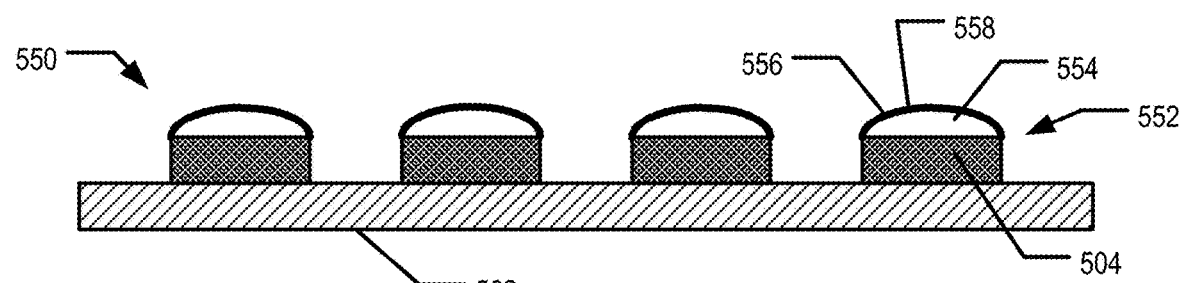
Figure 7A:
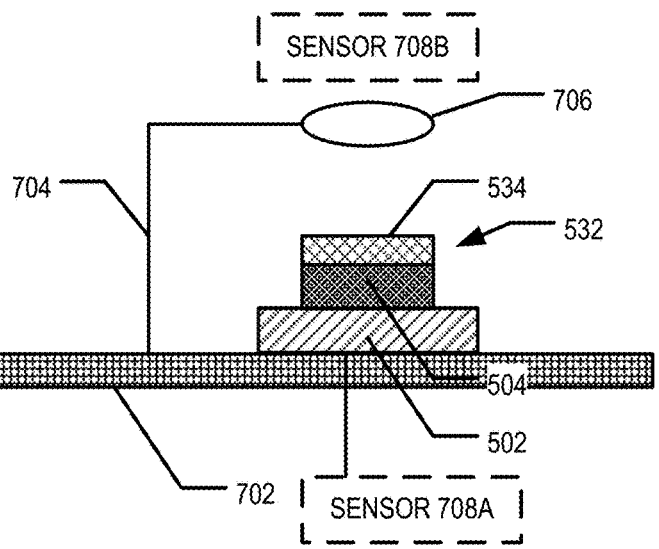
Figure 7B:
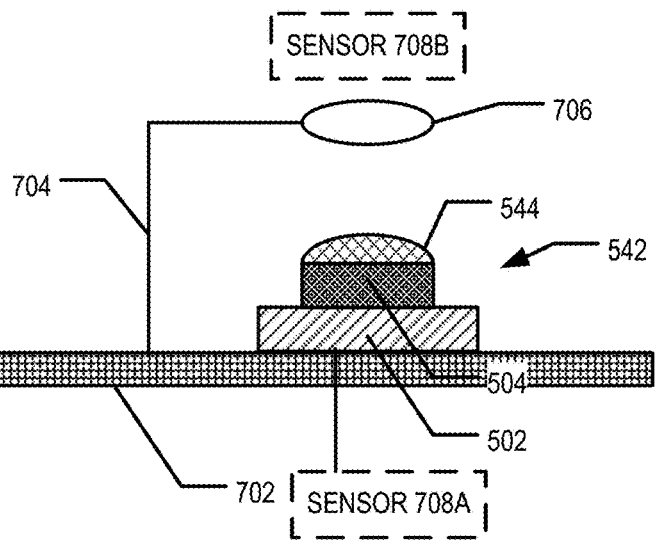
Figure 7C:
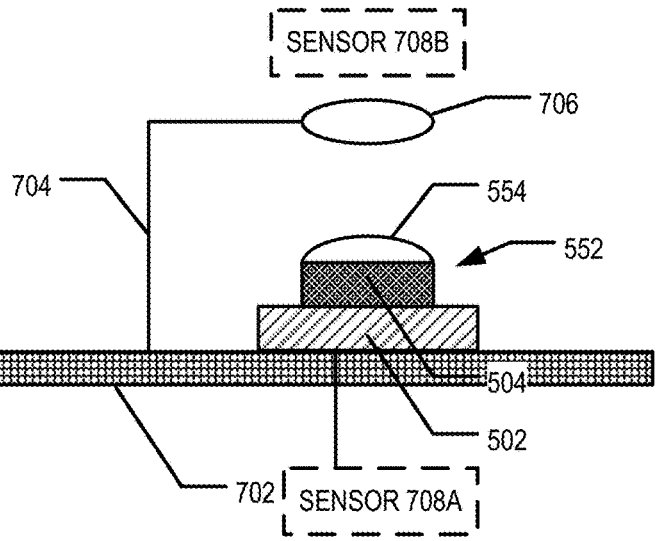
Figure 8A:
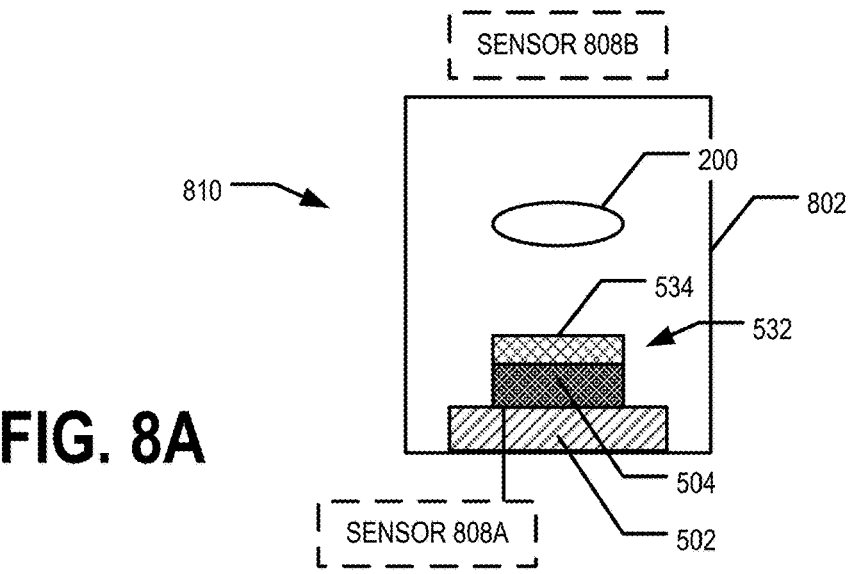
Figure 8B:
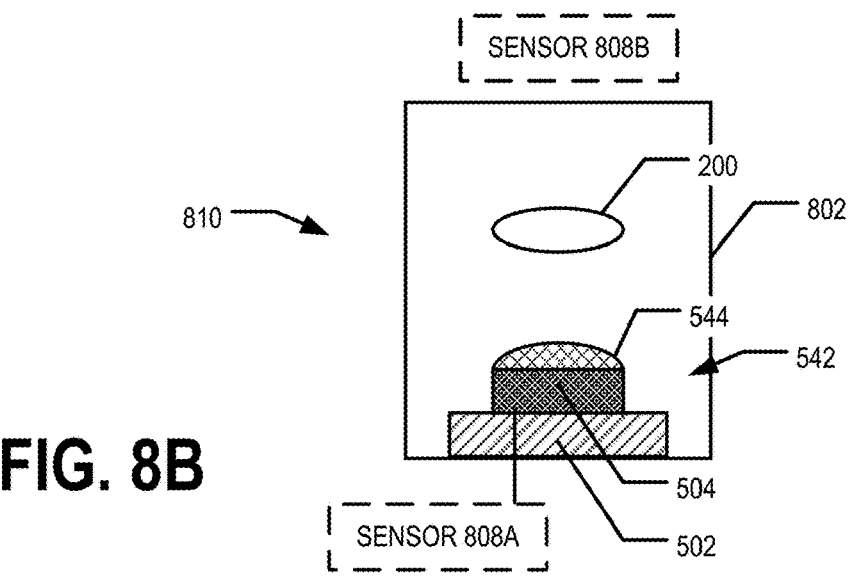
Figure 8C:
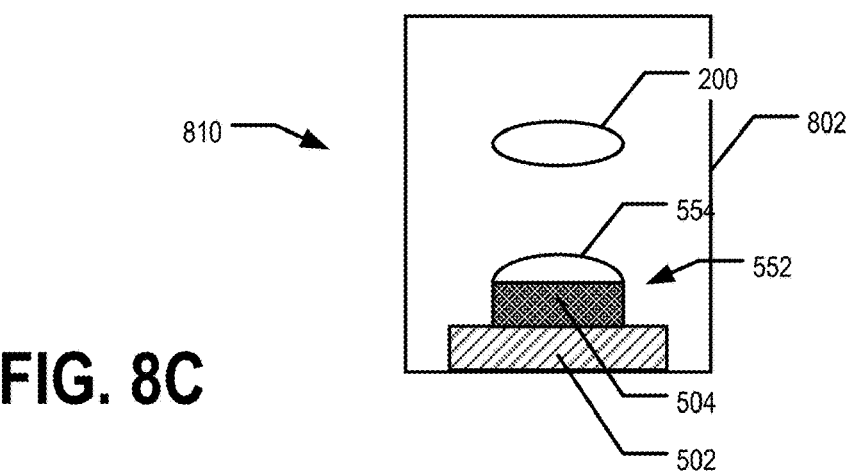
Figure 9:
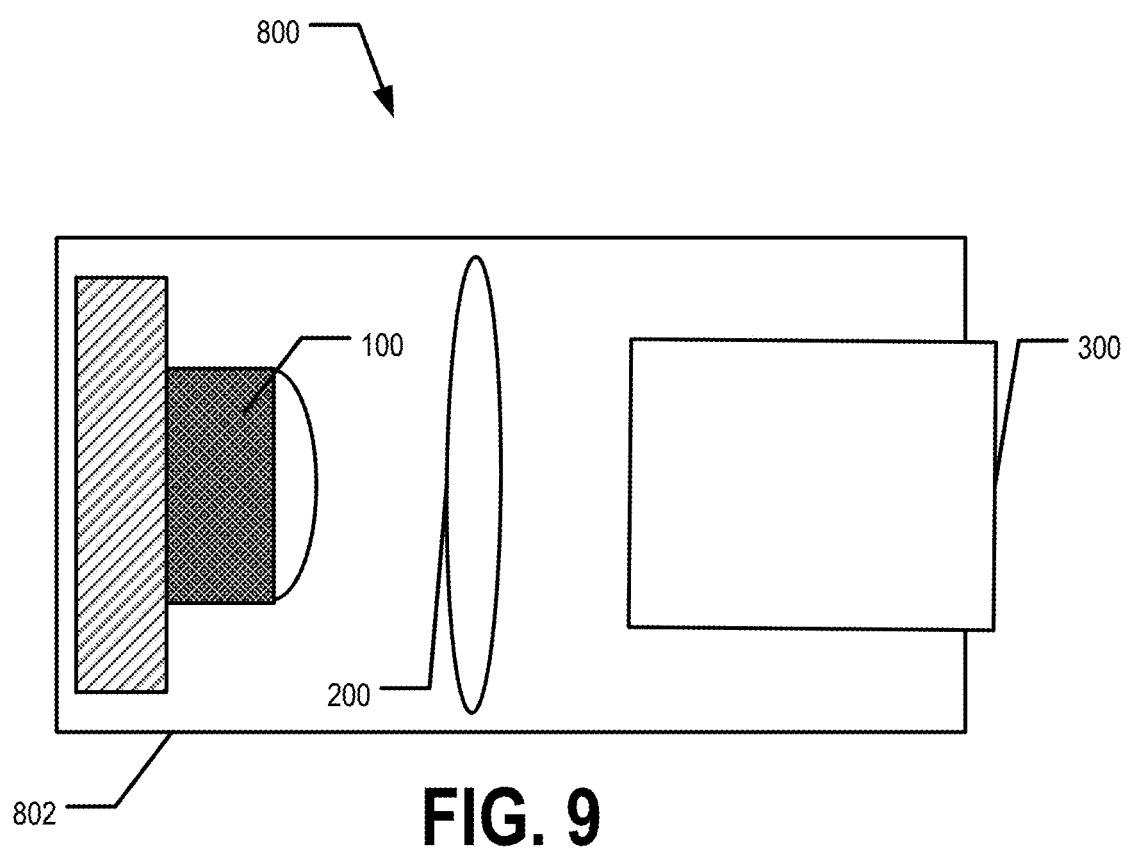

Having thus described the invention in general terms, reference will now be made to the accompanying drawings, which are not necessarily drawn to scale, and wherein:

FIG. 1 provides a plot illustrating the response of a photodiode with respect to lateral offset between the optical window of the electro-optical device and a signal source for a photodiode having an optical window with a 40 μm diameter and for another photodiode having an optical window with a 30 μm diameter;

FIG. 2 provides a schematic diagram of an electro-optical device, in accordance with an example embodiment;

FIG. 3 provides a schematic diagram showing coupling of an electro-optical device to an optical fiber, in accordance with an example embodiment;

FIGS. 4, 4A, 4B, and 4C provide flowcharts showing various processes, procedures, and/or operations for fabricating and/or manufacturing a couplable and/or composite electro-optical device, in accordance with some example embodiments;

FIGS. 5A, 5B, 5C, 5D, and 5E illustrate respective steps of fabricating and/or manufacturing an integrated lens formed as part of a couplable electro-optical device, in accordance with an example embodiment;

FIGS. 6A and 6B illustrate various steps of fabricating and/or manufacturing a couplable electro-optical device, in accordance with an example embodiment wherein respective integrated lenses are formed and cured for an array of couplable electro-optical devices simultaneously;

FIGS. 7A, 7B, and 7C illustrate various steps of fabricating and/or manufacturing a couplable electro-optical device, in accordance with an example embodiment wherein the forming and curing of the integrated lens occurs within an optical bench;

FIGS. 8A, 8B, and 8C illustrate various steps of fabricating and/or manufacturing a couplable electro-optical device, in accordance with an example embodiment wherein the forming and curing of the integrated lens occurs within an at least partially assembled composite electro-optical device; and FIG. 9 provides a schematic diagram of a portion of a receiver, transmitter, and/or transceiver comprising a couplable electro-optical device, in accordance with an example embodiment.

DETAILED DESCRIPTION OF THE INVENTION

FIG. 1 provides a plot comparing a photodiode response as a function of lateral offset of the optical window of the photodiode to the signal source (e.g., the core of an optical fiber) for a photodiode having an optical window with a diameter of 40 µm (triangles) and for a photodiode having an optical window with a diameter of 30 µm (diamonds). As can be seen from FIG. 1, for a photodiode having an optical window with a diameter of 30 µm (or less) there is very little allowance for misalignment of the optical window with the signal source. However, as bandwidth requirements increase, the optical windows of electro-optical devices (e.g., photodiodes, vertical cavity surface emitting lasers (VCSELs), single mode VCSELs, multimode VCSELs, and/or the like) will need to decrease to allow the electro-optical devices to operate at higher speeds. For example, when the electro-optical component is a VCSEL, a significant challenge is the coupling of the VCSEL to a small core fiber (e.g., a single mode fiber having a core diameter of approximately 9 µm versus a core diameter of approximately 50 µm for a multimode optical fiber) where the aperture of the VCSEL emitting area has a diameter of approximately 7 µm.

Various embodiments of the present invention provide technical solutions to the technical problems regarding electro-optical component alignment arising from the decrease in optical window size of the electro-optical component. For example, various embodiments provide electro-optical devices (e.g., couplable electro-optical devices and/or composite electro-optical devices comprising electro-optical components such as photodiodes, VCSELs, and/or the like) having small optical windows (e.g., with diameters less than 40 µm) that have improved coupling characteristics. For example, various embodiments provide couplable electro-optical devices (e.g., photodiodes, VCSELs, and/or the like) having an integrated lens. Various embodiments provide a composite electro-optical device such as a receiver, transmitter, and/or transceiver comprising a couplable electro-optical device. In various embodiments, the lens is formed by adhering unshaped lens material to the electro-optical component, shaping the lens material via a reflow process to form a shaped lens, and curing the shaped lens to form the integrated lens. In various embodiments, in an example embodiment, an array and/or a plurality of electro-optical components are formed on a common substrate (e.g., a wafer) and lens material is applied and/or adhered to each of the electro-optical components formed on the common substrate. In various embodiments, the lens is coated with an anti-reflection coating. In various embodiments, the couplable electro-optical device is a single mode VCSEL that may be coupled to an optical fiber, such as a small core optical fiber (e.g., an optical fiber with a diameter core of approximately 10 µm or less) without the use of expensive and time intensive active alignment techniques. In various embodiments, the optical fiber may be a multi-mode optical fiber or a single mode optical fiber.

FIGS. 2 and 3 provide schematic diagrams of couplable electro-optical devices 100 having improved coupling characteristics, in accordance with example embodiments. In various embodiments, the couplable electro-optical device 100 has improved coupling characteristics compared to the electro-optical component 120. In various embodiments, a couplable electro-optical device 100 comprises an electro-optical component 120 formed and/or fabricated on a substrate 110. In various embodiments, the substrate 110 is a wafer. For example, two or more electro-optical components 120 may be formed and/or fabricated on the substrate 110. In various embodiments, the electro-optical component 120 comprises an optical window 124. In various embodiments, the optical window 124 is a small optical window. For example, the optical window 124 has a diameter less than approximately 40 µm (e.g., 30 µm, 20 µm, 12 µm (e.g., in the case of a photodiode); 6 µm (e.g., in the case of VCSEL); and/or the like). In various embodiments, the electro-optical component 120 is a photodiode, VCSEL, or other electro-optical receiving device and/or emitting device.

In an example embodiment, the electro-optical component 120 comprises an active area. For example, when the electro-optical component 120 is a photodiode or other receiving device, the active area is the surface/area/volume/location at which signal detection occurs (e.g., where a photon is absorbed and causes movement of a charge carrier). In another example, when the electro-optical component 120 is a VCSEL or other emitting device, the active area is the surface/area/volume/location from which the light is emitted. In various embodiments, a modeling point 122 may be used to model the active area of the electro-optical component 120 as a point. For example, when the focal point 136 of the integrated lens 130 is located at the modeling point 122 of the electro-optical component 120, a beam incident on the active region of the electro-optical component 120 via the integrated lens 130 will have a beam width such that a significant portion of the beam (e.g., the central portion of the beam within the full width half maximum radius of the beam) is incident on the optimal portion of the active area for signal detection. In another example, when the focal point 136 of the integrated lens 130 is located at the modeling point 122 of the electro-optical component 120, a beam emitted from the active region and incident on the integrated lens 130 will be emitted from the couplable electro-optical device 100 with an approximately constant beam width (e.g., the beam may be modeled by approximately and/or substantially parallel rays).

In various embodiments, the couplable electro-optical device 100 comprises an integrated lens 130. In various embodiments, the integrated lens comprises a lens portion 134 and a spacer portion 132. In an example embodiment, the lens portion 134 has a radius of curvature R and a thickness T, and the spacer portion 132 has a depth D such that the focal point 136 of the integrated lens 130 is coincident with the modeling point 122. As should be understood by one skilled in the art in light of this disclosure, the radius of curvature R and the depth D are determined based on the modeling point 122 and the refractive index n of the material of the integrated lens 130. In various embodiments, the integrated lens 130 is formed by fabricating the spacer portion 132 around and/or on the electro-optical component 120 and/or the substrate 110 and then forming the lens portion 134 onto the spacer portion 132. In various embodiments, the integrated lens 130 is an integrated microlens.

In various embodiments, the depth D is in the range of approximately 0.03 mm to 0.05 mm. In various embodiments, the depth D is in the range of approximately 0.035 mm to 0.045 mm. In an example embodiment, the depth D is approximately 0.4 mm. In various embodiments, the radius of curvature R is in the range of approximately 20 to 35 In various embodiments, the radius of curvature R is in the range of approximately 25-30 For example, the radius of curvature R may be in the range of approximately 26-28 In various embodiments, the thickness T is in the range of approximately 5-25 In various embodiments, the thickness T is in the range of approximately 8-16 In an example embodiment, the thickness T is in the range of approximately 10-14 μm.

In various embodiments, the integrated lens 130 is made of a lens material selected for a combination of the mechanical and optical properties of the material. In an example embodiment, the integrated lens 130 is made of a lens material that is a polymeric material. In an example embodiment, the lens material is a curable polymeric material. In an example embodiment, curing the polymeric material to cure the shaped lens to form the integrated lens includes heating the polymeric material and/or exposing the polymeric material to UV light. In an example embodiment, the lens material is a polymeric material that requires heat and/or UV curing. For example, the lens material may be a liquid resin that when cured becomes a solid polymeric material. In an example embodiment, the lens material is a hybrid inorganic-organic polymeric material. In various embodiments, the cured lens material has a refractive index n in the range of approximately 1.2 to 1.9. In an example embodiment, the cured lens material has a refractive index n in the range of approximately 1.4 to 1.6. For example, in an example embodiment, the cured lens material has a refractive index n in the range of approximately 1.50 to 1.55. In various embodiments, the cured lens material has a refractive index n in the range of approximately 1.50 to 1.55 in the wavelength range 400-1600 nm. In various embodiments, the cured lens material has a refractive index n in the range of approximately 1.50 to 1.52 in the wavelength range of 700-1600 nm. In various embodiments, the spacer portion 132 and the lens portion 134 are made of the same or different materials having the same or different refractive indices.

In various embodiments, the integrated lens 130 comprises an anti-reflective coating 140. For example, the outer surface 132 of the integrated lens 130 may be the surface of the integrated lens 130 that faces away from the electro-optical component 120. In various embodiments, the outer surface 132 of the integrated lens 130 may have an anti-reflective coating 140 thereon. In various embodiments, the anti-reflective coating 140 may be selected based on the wavelength of light that the electro-optical component 120 is configured to receive/detect and/or emit. In an example embodiment, the thickness of the anti-reflective coating 140 is selected based on the wavelength of light that the electro-optical component 120 is configured to receive and/or emit.

In various embodiments, the couplable electro-optical device 100 may be coupled to an optical fiber 300. In various embodiments, the couplable electro-optical device 100 is coupled to the optical fiber 300 without the use of active alignment. In various embodiments, the couplable electro-optical device 100 is coupled to the optical fiber 300 via a secondary lens 200. In an example embodiment, the optical fiber 300 is a small core optical fiber. For example, the optical fiber 300 may comprise an outer fiber cladding 302 and an optical fiber core 304. In an example embodiment, the optical fiber core 304 has a diameter of approximately 9 For example, the optical fiber core 304 may have a diameter less than 15 In an example embodiment, the optical fiber core 304 has a diameter in the range of 5 μm to 65 μm. For example, the integrated lens 130 may condition the light emitted by the electro-optical component 120 (e.g., a VCSEL) such that the light emitted by the couplable electro-optical device 100 is described by a set of substantially parallel rays. The secondary lens 200 may then be used to focus the light emitted by the couplable electro-optical device 100 into the core 304 of the optical fiber 300. Thus, the couplable electro-optical device 100 may be efficiently coupled to a small core optical fiber 300 (e.g., having a core 304 diameter of approximately 10 μm or less) without the use of expensive and time intensive active alignment techniques. Rather, a static and/or mounted secondary lens 200 may be employed to focus the light emitted by the couplable electro-optical device 100 onto the core 304 of the optical fiber 300 for an efficient coupling.

Figure 4:
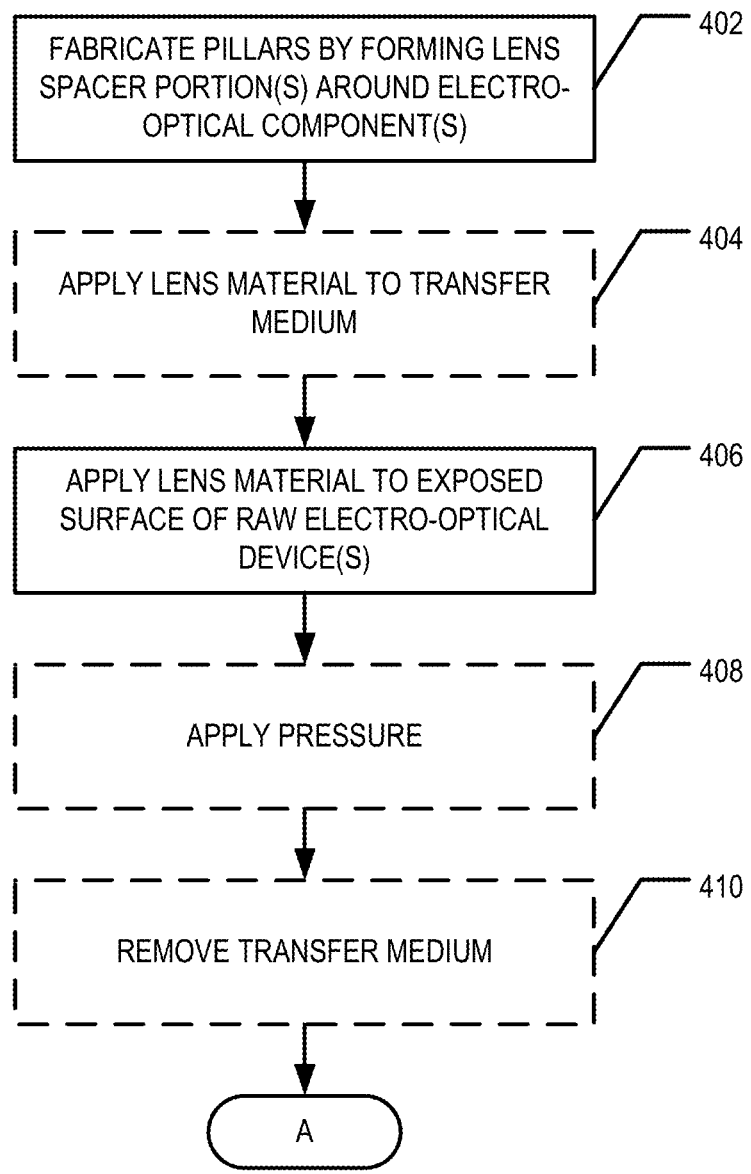
Figure 4A:
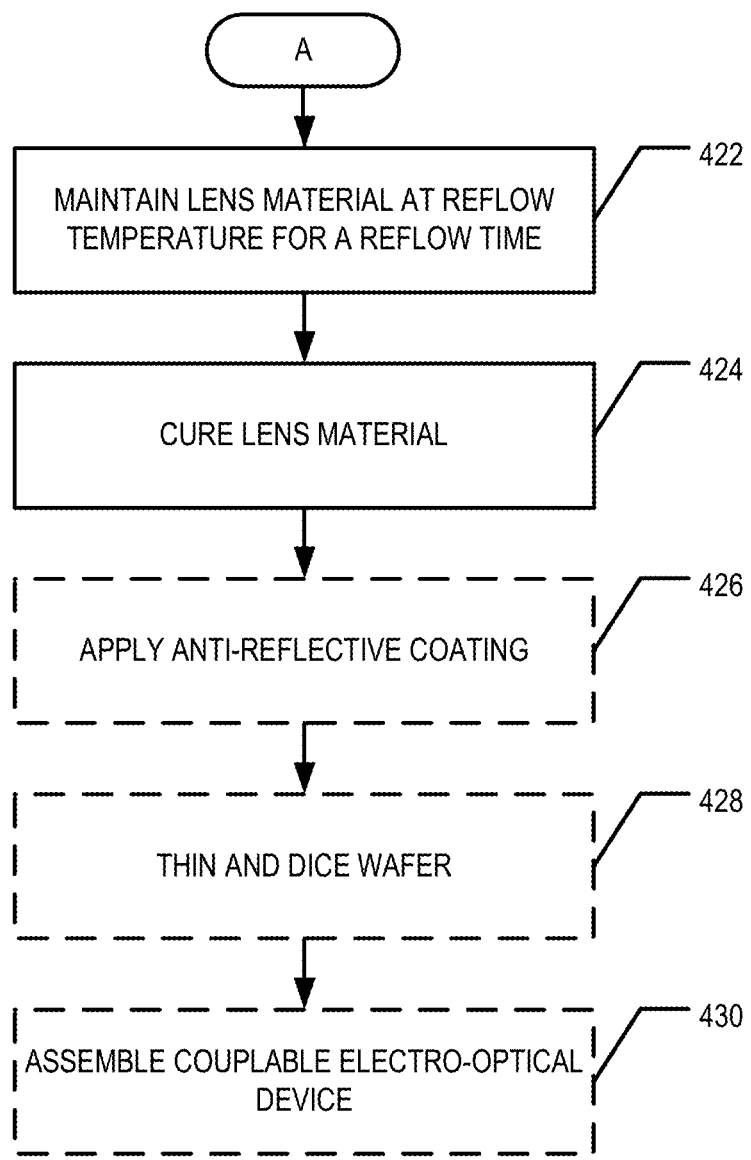
Figure 4B:
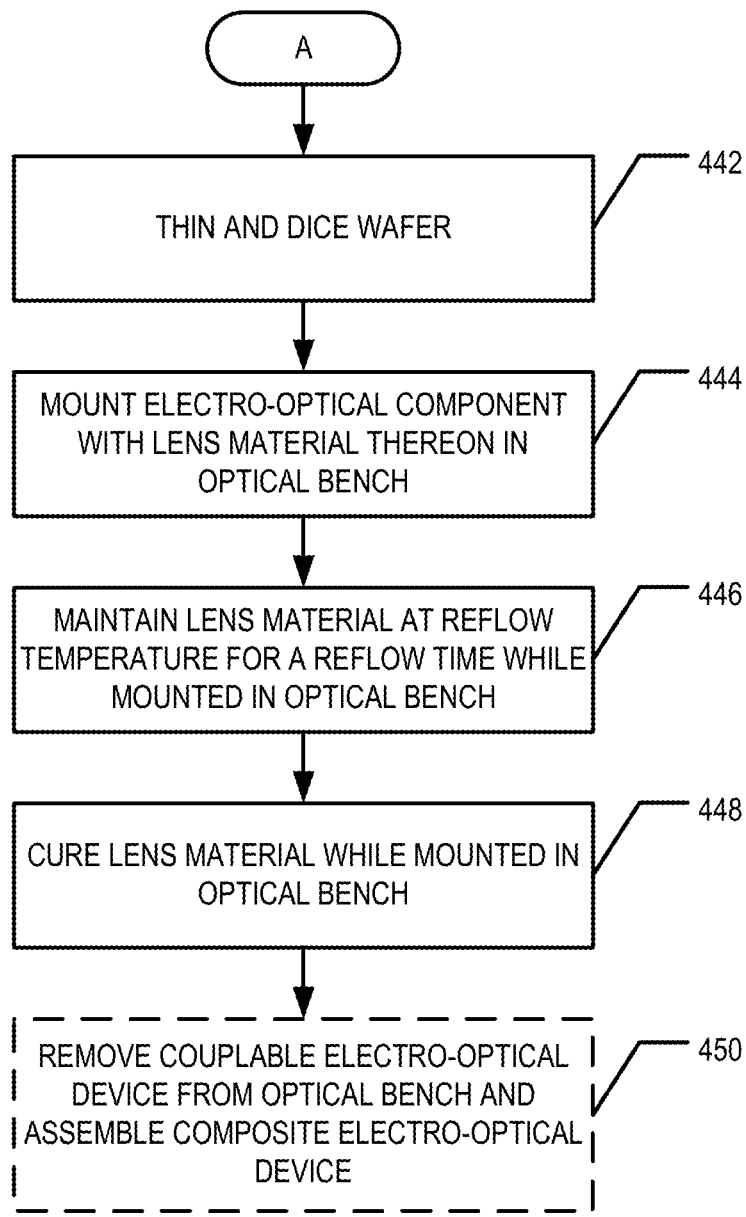
Figure 4C:
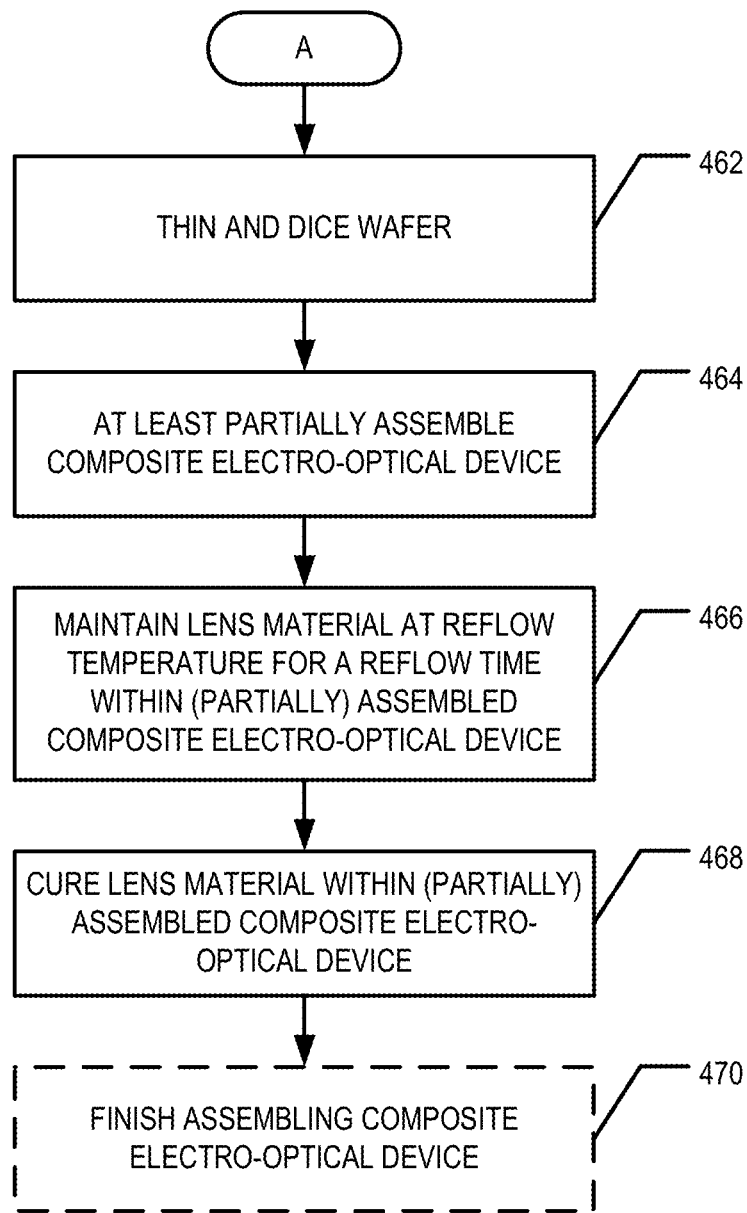

FIG. 4 provides a flowchart describing various processes, procedures, operations, and/or the like for fabricating a couplable electro-optical device 100, in accordance with an example embodiment. In particular, FIG. 4 provides a flowchart describing various processes, procedures, operations, and/or the like for adhering unshaped lens material to an electro-optical component. Each of FIGS. 4A, 4B, and 4C provides a flowchart illustrating various processes, procedures, operations, and/or the like for three different techniques for fabricating a couplable electro-optical device once the unshaped lens material is adhered to the electro-optical component.

Starting at step/operation 402, the electro-optical component 120 is fabricated on the substrate 110. A spacer portion 132 is then formed on and/or around the electro-optical component 120. For example, lens spacer material may be applied, grown, and/or deposited onto the electro-optical component 120 and then etched as necessary to from a pillar. In an example embodiment, the pillar is cylindrical in shape. In an example embodiment, the etching and/or depositing of the lens spacer material is performed using a photolithography process. In an example embodiment, the lens spacer material is cured before lens material is applied to the exposed surface of the pillar.

Figure 5A:
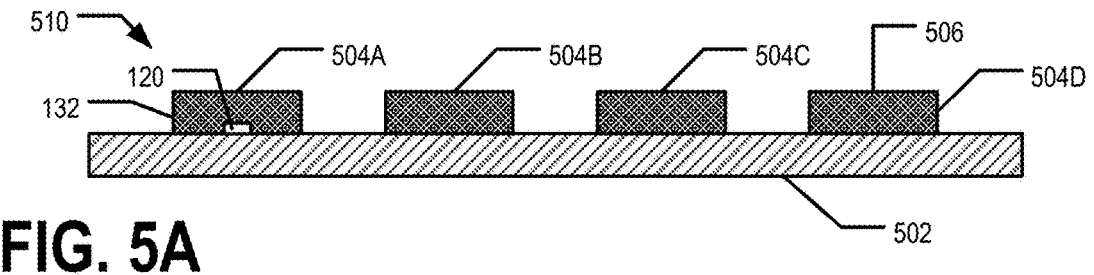

In an example embodiment, a plurality (e.g., two or more, possibly 40,000-80,000) electro-optical components 120 are fabricated on the same substrate 110 (e.g., on a wafer). For example, an array of electro-optical components 120 may be formed on a common substrate 110. For example, one or more photodiodes may be fabricated on the substrate 110. In another example, one or more VCSELs may be fabricated on the substrate 110. In various embodiments, the fabricating electro-optical components comprises depositing one or more layers onto the substrate, performing one or more etching processes, and/or the like. An array of spacer portions may then be formed by applying, growing, and/or depositing lens spacer portion material to the array of electro-optical components 120 and/or the substrate 110 and then performing on or more etching steps to form an array of pillars. In various embodiments, each pillar of the array of pillars is a cylinder. FIG. 5A illustrates a plurality and/or array 510 of pillars 504 (e.g., 504A, 504B, 504C, 504D) formed and/or fabricated on a substrate 502. Each pillar 504 comprises a spacer portion 132 formed on and/or around a respective electro-optical component 120.

Figure 5B:
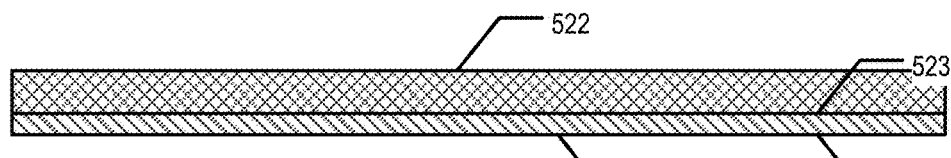

Continuing with step/operation 404 of FIG. 4, the lens material is applied to a transfer medium. In various embodiments, the transfer medium is a foil (e.g., a thin and/or metal sheet). For example, the lens material is coated onto the transfer medium, in an example embodiment. In an example embodiment, the lens material is coated onto the transfer medium using a spin coating process. In an example embodiment, the spin coating process comprises applying the lens material to a center of the transfer medium and then spinning the transfer medium to cause the lens material to disperse (e.g., via centrifugal force) uniformly across the surface of the transfer medium. In an example embodiment, the lens material is coated onto the transfer medium using a block co-polymer technique. FIG. 5B illustrates lens material 522 that is uniformly applied to a transfer medium 524.

Figure 5C:
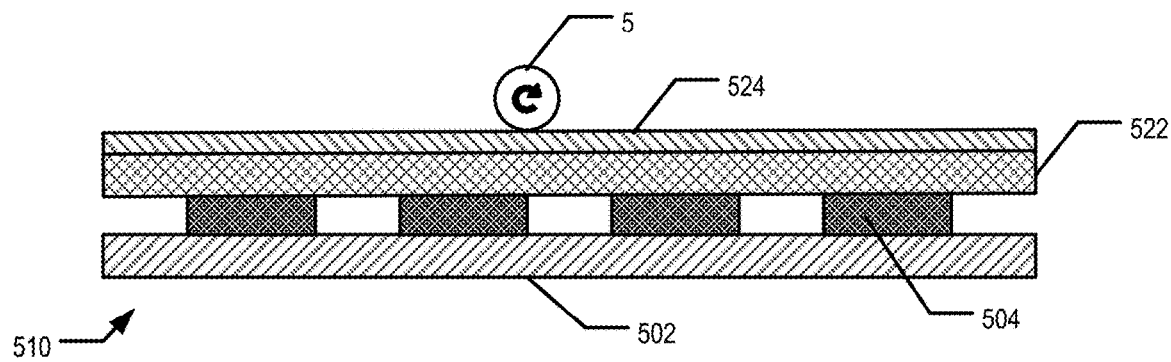

Continuing with step/operation 406 of FIG. 4, the lens material 522 is applied to the exposed surface 506 of the pillars 504. For example, the transfer medium 524 having the lens material 522 applied to a first side 523 thereof, may be positioned and/or placed onto the array of electro-optical components 510 such that the lens material 522 is adjacent to, adheres to, and/or is in contact with the respective exposed surfaces 506 of the pillars 504. In an example embodiment, at step/operation 408, pressure is applied to a second surface 525 of the transfer medium 524 to aid in the adhering of the lens material to the respective exposed surfaces 506 of the pillars 504. For example, as shown in FIG. 5C, a roller 5 (and/or a plate component and/or other pressure applying component) may be used to apply pressure to a second surface 525 of the transfer medium 524 to aid in the adhering of the lens material 522 to the respective exposed surfaces 506 of the pillars 504. As the lens material 522 is uniformly distributed across the transfer medium 524, a precise alignment of the transfer medium 524 and the array of electro-optical components 510 is not required.

Figure 5D:
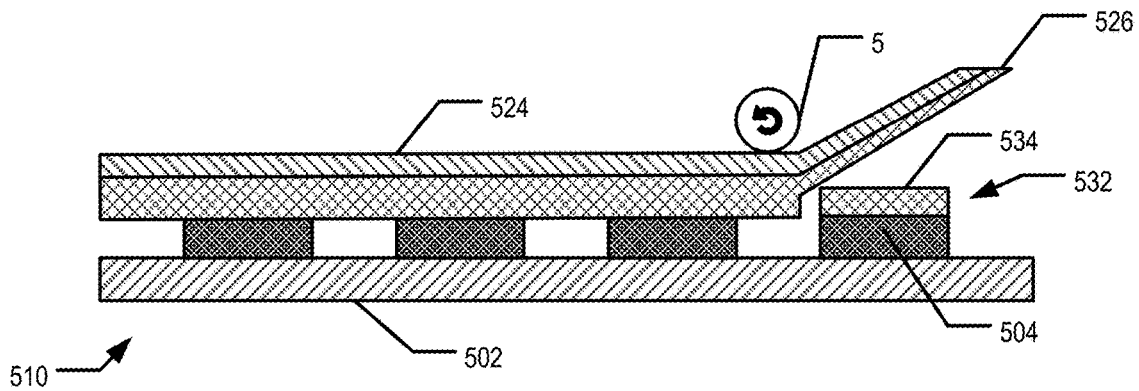

Continuing with step/operation 410 of FIG. 4, the transfer medium 524 is removed. For example, the transfer medium 524, and possibly some residual lens material 526, is lifted off of the substrate 502 and the pillars 504 formed thereon. As the transfer medium 524 is lifted off of the pillars 504, at least a portion of the lens material remains adhered to each of the pillars 504. For example, the unshaped lens material 534 remains adhered to the pillar 504, as shown in FIG. 5D. In an example embodiment, the same roller 5 or a different roller is used to lift the transfer medium 524 from the pillars 504.

Figure 5E:
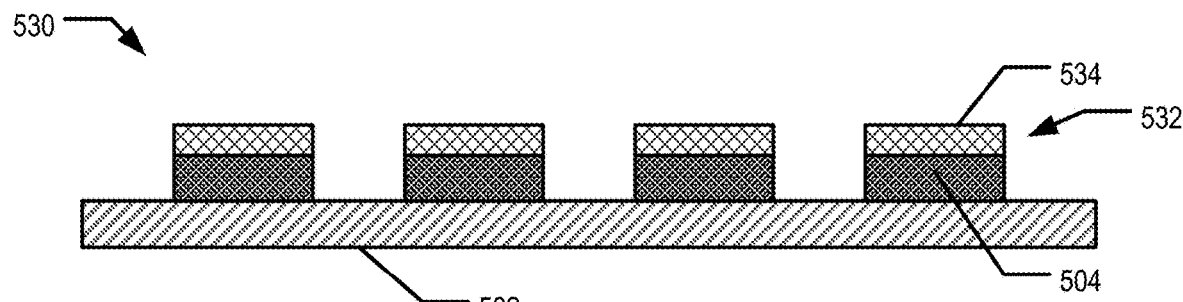

FIG. 5E illustrates an in-progress array 530 of in-progress electro-optical devices 532 comprising a plurality of pillars 504 formed on the substrate 502, with each of the electro-optical components having respective unformed lens material 534 adhered to the exposed surface 506 thereof. The array 530 of in-progress electro-optical devices 532 is formed by the completion of adhering the lens material to the electro-optical components and/or the removal of the transfer medium at point A of FIG. 4.

Each of FIGS. 4A, 4B, and 4C provides a flowchart illustrating a technique and/or method for completing the fabrication of a couplable electro-optical device 100 and/or a composite electro-optical device 800 once respective unshaped lens material 534 is adhered to each of the pillars 504. In particular, FIG. 4A, corresponding to FIGS. 6A-6B, provides a flowchart illustrating processes, procedures, and/or operations for forming a respective integrated lens for an array of couplable electro-optical devices formed on the substrate 502 simultaneously. FIG. 4B, corresponding to FIGS. 7A-7C, provides a flowchart illustrating processes, procedures, and/or operations for forming an integrated lens for a couplable electro-optical device on an optical bench. FIG. 4C, corresponding to FIGS. 8A-8C, provides a flowchart for forming an integrated lens for a couplable electro-optical device within an at least partially assembled composite electro-optical device. Each of these techniques will now be described in turn.

Starting with step/operation 422 of FIG. 4A, the respective unshaped lens material 532 is maintained at a reflow temperature for a reflow time such that the unshaped lens material 534 is formed into a shaped lens 544, as shown in FIG. 6B. For example, the in-progress electro-optical devices 532 formed on the substrate 502 may be heated to a reflow temperature and then maintained at the reflow temperature for a reflow time. While the in-progress electro-optical devices 532 are maintained at the reflow temperature, the unshaped lens material 534 flows (e.g., via reflow process) into a shaped lens 544. For example, while the in-progress electro-optical devices 532 are maintained at the reflow temperature, the lens material may flow and, based on various properties of the lens material (e.g., surface tension, and/or the like), the lens material may be caused to flow into a lens shape to form a shaped lens 544. For example, the reflow temperature and the reflow time are configured such that the after the in-progress electro-optical devices 532 are maintained at the reflow temperature for the reflow time, the unshaped lens material 534 has flowed into a shaped lens 544.

FIG. 6A shows the result of step/operation 422. In particular, FIG. 6A illustrates a formed array 540 on the substrate 502 comprising a plurality of formed electro-optical devices 542, each comprising an pillar 504 having a formed lens 544 adhered to the exposed surface 506 thereof. In an example embodiment, the formed lens 544 has substantially the same shape as the integrated lens 554 of the couplable electro-optical device 552 (See FIG. 6B). In an example embodiment, the formed lens 544 has a shape that is configured to evolve and/or progress into the shape of the integrated lens 554 during the performance of a curing process.

Continuing with step/operation 424 of FIG. 4A, the formed lens 544 is cured to form the integrated lens 554. For example, the formed array 540 may be subjected to a curing temperature for a curing time, subjected to UV rays for a curing time, and/or the like, as appropriate for the lens material, to cure the formed lenses 544 to form integrated lenses 554. For example, the formed lenses 544 of the formed electro-optical devices 542 are cured to form the integrated lenses 554 of the couplable electro-optical devices 552. In an example embodiment, the spacer portion 132 of the pillar was cured before the lens material was adhered to the exposed surface of the pillar. In an example embodiment, the spacer portion 132 of the pillar is cured as the same time as the formed lens.

In an example embodiment, the lens material is OrmoComp®, by Micro Resist Technology, which cures at a curing temperature of approximate 150° C. with a curing time of approximately three hours and the lens spacer material is STD SU8 2000 with a curing temperature of 150-250° C. with a curing time of 5-30 minutes.

FIG. 6B shows the result of step/operation 424. In particular, FIG. 6B illustrates a couplable array 550 comprising a plurality of couplable electro-optical devices 552 each comprising a respective integrated lens 554 adhered to and/or formed onto a respective pillar 504 formed on the substrate 502. In an example embodiment, the shape of the integrated lens 554 is configured (in accordance with and/or based at least in part on the refractive index of the cured lens material) to focus light incident on the curved surface 556 onto the modeling point 122 (e.g., through the optical window 124 and into the active region of the pillar 504). In an example embodiment, the shape of the integrated lens 554 is configured (in accordance with and/or based at least in part on the refractive index of the cured lens material) to refract light emitted by the active region of the pillar 504 such that the light exiting the curved surface 556 can be approximated by parallel rays.

Returning to FIG. 4A, at step/operation 426, an anti-reflective coating may be applied to the exposed surface of the integrated lens 554. In various embodiments, the exposed surface of the integrated lens 554 is the curved surface 556. For example, in various embodiments, one or more and/or each couplable electro-optical device 552 of the couplable array 550 is coated with an anti-reflective coating 558. In various embodiments, the anti-reflective coating 558 may be selected based on the wavelength of light that the electro-optical component 120 is configured to receive/detect and/or emit. In an example embodiment, the thickness of the anti-reflective coating 558 is selected based on the wavelength of light that the electro-optical component 120 is configured to receive and/or emit.

At step/operation 428 the couplable electro-optical devices 552 may be tested and the substrate 502 (e.g., wafer) may be thinned and diced. For example, the substrate 502 may be cut so that each couplable electro-optical device 552 of the couplable array 550 formed on the substrate 502 may be incorporated into various devices independently. In an example embodiment, the substrate 502 may be cut so that smaller arrays of couplable electro-optical devices 552 (e.g., arrays comprising fewer couplable electro-optical devices than the couplable array 550) may be incorporated into various devices.

At step/operation 430, one or more composite electro-optical devices are assembled to include one or more couplable electro-optical devices 552. For example, a couplable electro-optical device 552 may be incorporated into a composite electro-optical device such as a receiver, transmitter, and/or transceiver. For example, a couplable electro-optical device 552 may be incorporated into a receiver, transmitter, and/or transceiver using passive alignment techniques for aligning the couplable electro-optical device 552 with an optical fiber 300 or other waveguide. For example, a couplable electro-optical device 552 may be incorporated into a receiver, transmitter, and/or transceiver using a secondary lens 200 to passively align the couplable electro-optical device 100 to an optical fiber 300 or other waveguide.

Turning now to FIG. 4B, the substrate 502 on which the array 520 of in-progress electro-optical devices 532 is formed is thinned and diced at step/operation 442. For example, the substrate 502 may be cut so that a couplable electro-optical device 552 may be incorporated into a composite electro-optical device independently. In an example embodiment, the substrate 502 may be cut so that an array of couplable electro-optical devices 552 may be incorporated into a composite electro-optical device.

At step/operation 444, an in-progress electro-optical device 532 (or an array of in-progress electro-optical devices 532) is mounted to an optical bench. In various embodiments, the optical bench comprises one or more optical components configured to mimic, approximate, and/or model the optical path of a composite electro-optical device into which the resulting couplable electro-optical device 552 is to be incorporated. For example, a couplable electro-optical device 552 may be fabricated with the purpose of incorporating the couplable electro-optical device 552 into a particular composite electro-optical device having a particular optical path (e.g., a particular optical fiber and/or other waveguide to which the couplable optical device 552 is to be coupled via one or more lenses and/or lens assembly(ies)). The optical bench may be outfitted with one or more optical components configured to mimic, approximate, and/or model the particular optical path. For example, as shown in FIG. 7A, an in-progress electro-optical device 534 may be mounted to an optical bench 702. One or more optical component stands 704 may also be mounted to the optical bench 702. The one or more optical component stands 704 hold and/or have mounted thereto, one or more optical components 706 (e.g., lens(es), lens assembly(ies), and/or the like) configured to mimic, approximate, and/or model, at least in part, the particular optical path.

At step/operation 446, while the in-progress electro-optical device 532 is mounted to the optical bench 702, the unshaped lens material 532 is maintained at reflow temperature for a reflow time such that the unshaped lens material 534 is formed in to a shaped lens 544, as shown in FIG. 7B. For example, the in-progress electro-optical devices 532 formed on the substrate 502 may be heated to a reflow temperature and then maintained at the reflow temperature for a reflow time. While the in-progress electro-optical devices 532 are maintained at the reflow temperature, the unshaped lens material 534 flows (e.g., via reflow process) into a shaped lens 544. For example, while the in-progress electro-optical devices 532 are maintained at the reflow temperature, the lens material may flow and, based on various properties of the lens material (e.g., surface tension, and/or the like), the lens material may be caused to flow into a lens shape to form a shaped lens 544. For example, the reflow temperature and the reflow time are configured such that the after the in-progress electro-optical device 532 is maintained at the reflow temperature for the reflow time, the unshaped lens material 534 has flowed into a shaped lens 544.

In various embodiments, the reflow temperature and/or the reflow time is determined based at least in part on signals output by one or more sensors 708A, 708B. For example, an electrical sensor 708A may detect and provide an output signal indicating an electrical signal generated by the pillar 504 and/or detect and provide an output signal indicating an electrical signal being provided to the pillar 504. For example, an optical sensor 708B may detect and provide an output signal indicating an optical signal generated by the in-progress electro-optical device 532 and/or detect and provide an output signal indicating an optical signal provided to the in-progress electro-optical device 532. The reflow temperature and/or reflow time may be determined based at least in part on output signals provided by the electrical sensors 708A and/or the optical sensor 708B. For example, the electrical sensor 708A may provide an output signal that indicates the voltage or power of an electrical signal generated by an pillar 504 that is a photodiode in response to an input optical signal. For example, the optical sensor 708B may provide an output signal that indicates the power present in an optical signal generated by an pillar 504 that is a VCSEL. In various embodiments, the determining is performed by a process controller (e.g., a controller configured to control the operation of a heater or oven configured to maintain the unshaped lens material 534 at the reflow temperature for the reflow time) and/or by a human operator. For example, the reflow time and/or reflow temperature may be determined based on the output signal of at least one of the sensors 708A, 708B indicating a voltage or power that surpasses a threshold voltage or power value.

For example, a process controller may comprise one or more analog-to-digital converters configured to receive the output signals, one more processing elements (e.g., processors, field programmable gate arrays (FPGAs), application specific integrated circuits (ASICs), and/or the like), and/or computer-readable memory. The processing elements are configured to execute executable instructions (e.g., stored in the memory) that cause the processing elements to analyze and/or process the output signals received from the sensor(s)

708A, 708B and to determine the reflow temperature and/or reflow time and to control a heater or oven to maintain the unshaped lens material 534 at the reflow temperature for the reflow time such that the unshaped lens material 534 flows into a shaped lens 544.

FIG. 7B shows the result of step/operation 446. In particular, FIG. 7B illustrates a formed electro-optical device 542 comprising an pillar 504 having a formed lens 544 adhered to the exposed surface 506 thereof mounted to the optical bench 702. In an example embodiment, the formed lens 544 has substantially the same shape as the integrated lens 554 of the couplable electro-optical device 552 (See FIG. 7C). In an example embodiment, the formed lens 544 has a shape that is configured to evolve and/or progress into the shape of the integrated lens 554 during the performance of a curing process.

Continuing with step/operation 448 of FIG. 4B, the formed lens 544 is cured to form the integrated lens 554. In an example embodiment, the curing process is performed while the formed electro-optical device 542 is mounted to the optical bench 702. For example, the formed electro-optical device 542 may be subjected to a curing temperature for a curing time, subjected to UV rays for a curing time, and/or the like, as appropriate for the lens material, to cure the formed lens 544 to form the integrated lens 554. For example, the formed lens 544 of the formed electro-optical device 542 is cured to form the integrated lens 554 of the couplable electro-optical device 552.

FIG. 7C shows the result of step/operation 448. In particular, FIG. 7C illustrates a couplable electro-optical device 552 comprising an integrated lens 554 adhered to and/or formed onto an pillar 504 formed on the substrate 502. In an example embodiment, the shape of the integrated lens 554 is configured (in accordance with and/or based at least in part on the refractive index of the cured lens material) to focus light incident on the curved surface 556 onto the modeling point 122 (e.g., through the optical window 124 and into the active region of the electro-optical component 504). In an example embodiment, the shape of the integrated lens 554 is configured (in accordance with and/or based at least in part on the refractive index of the cured lens material) to refract light emitted by the active region of the pillar 504 such that the light exiting the curved surface 556 can be approximated by parallel rays.

Continuing with FIG. 4B, at step/operation 450, the couplable electro-optical device 552 is removed from the optical bench 702 and a composite electro-optical device comprising the couplable electro-optical device 552 may be assembled. For example, a composite electro-optical device is assembled to include one or more couplable electro-optical devices 552. For example, a couplable electro-optical device 552 may be incorporated into a composite electro-optical device such as a receiver, transmitter, and/or transceiver. For example, a couplable electro-optical device 552 may be incorporated into a receiver, transmitter, and/or transceiver using passive alignment techniques for aligning the couplable electro-optical device 552 with an optical fiber 300 or other waveguide. For example, a couplable electro-optical device 552 may be incorporated into a receiver, transmitter, and/or transceiver using a secondary lens 200 to passively align the couplable electro-optical device 100 to an optical fiber 300 or other waveguide.

Turning now to FIG. 4C, the substrate 502 on which the array 520 of in-progress electro-optical devices 532 is formed is thinned and diced at step/operation 462. For example, the substrate 502 may be cut so that a couplable electro-optical device 552 may be incorporated into a composite electro-optical device independently. In an example embodiment, the substrate 502 may be cut so that an array of couplable electro-optical devices 552 may be incorporated into a composite electro-optical device.

At step/operation 464, a composite electro-optical device is at least partially assembled. For example, an in-progress electro-optical device 532 (or an array of in-progress electro-optical devices 532) is assembled into an at least partially assembled composite electro-optical device. In various embodiments, at least a portion of the optical components configured to condition light to be provided to the resulting couplable electro-optical device and/or condition light generated by the resulting couplable electro-optical device are assembled into the at least partially assembled composite electro-optical device. For example, as shown in FIG. 8A, an at least partially assembled composite electro-optical device 810 comprises an in-progress electro-optical device 532 mounted within a device housing 802. The at least partially assembled composite electro-optical device 810 may comprise the secondary lens 200 and/or other optical components of the composite electro-optical device.

At step/operation 466, while the in-progress electro-optical device 532 is mounted within the at least partially assembled composite electro-optical device 810, the unshaped lens material 532 is maintained at a reflow temperature for a reflow time such that the unshaped lens material 534 is formed into a shaped lens 544, as shown in FIG. 8B. For example, the in-progress electro-optical devices 532 formed on the substrate 502 may be heated to a reflow temperature and then maintained at the reflow temperature for a reflow time. While the in-progress electro-optical devices 532 are maintained at the reflow temperature, the unshaped lens material 534 flows (e.g., via reflow process) into a shaped lens 544. For example, while the in-progress electro-optical device 532 is maintained at the reflow temperature, the lens material may flow and, based on various properties of the lens material (e.g., surface tension, and/or the like), the lens material may be caused to flow into a lens shape to form a shaped lens 544. For example, the reflow temperature and the reflow time are configured such that the after the in-progress electro-optical devices 532 are maintained at the reflow temperature for the reflow time, the unshaped lens material 534 has flowed into a shaped lens 544.

In various embodiments, the reflow temperature and/or the reflow time is determined based at least in part on signals output by one or more sensors 808A, 808B. For example, an electrical sensor 808A may detect and provide an output signal indicating an electrical signal generated by the pillar 504 and/or detect and provide an output signal indicating an electrical signal being provided to the electro-optical component 120 within the pillar 504. For example, an optical sensor 808B may detect and provide an output signal indicating an optical signal generated by the in-progress electro-optical device 532 and/or detect and provide an output signal indicating an optical signal provided to the in-progress electro-optical device 532. The reflow temperature and/or reflow time may be determined based at least in part on output signals provided by the electrical sensors 808A and/or the optical sensor 808B. In various embodiments, the determining is performed by a process controller (e.g., a controller configured to control the operation of a heater or oven configured to maintain the unshaped lens material 534 at the reflow temperature for the reflow time) and/or by a human operator. For example, a process controller may comprise one or more analog-to-digital converters configured to receive the output signals, one more processing elements (e.g., processors, field programmable gate arrays (FPGAs), application specific integrated circuits (ASICs), and/or the like), and/or computer-readable memory. The processing elements are configured to execute executable instructions (e.g., stored in the memory) that cause the processing elements to analyze and/or process the output signals received from the sensor(s) 808A, 808B and to determine the reflow temperature and/or reflow time and to control a heater or oven to maintain the unshaped lens material 534 at the reflow temperature for the reflow time such that the unshaped lens material 534 flows into a shaped lens 544.

FIG. 8B shows the result of step/operation 466. In particular, FIG. 8B illustrates a formed electro-optical device 542 comprising an pillar 504 having a formed lens 544 adhered to the exposed surface 506 thereof mounted within an at least partially assembled composite electro-optical device 810. In an example embodiment, the formed lens 544 has substantially the same shape as the integrated lens 554 of the couplable electro-optical device 552 (See FIG. 8C). In an example embodiment, the formed lens 544 has a shape that is configured to evolve and/or progress into the shape of the integrated lens 554 during the performance of a curing process.

Continuing with step/operation 468 of FIG. 4C, the formed lens 544 is cured to form the integrated lens 554. In an example embodiment, the curing process is performed while the formed electro-optical device 542 is mounted within the at least partially assembled composite electro-optical device 810. For example, the formed electro-optical device 542 may be subjected to a curing temperature for a curing time, subjected to UV rays for a curing time, and/or the like, as appropriate for the lens material, to cure the formed lens 544 to form the integrated lens 554. For example, the formed lens 544 of the formed electro-optical device 542 is cured to form the integrated lens 554 of the couplable electro-optical device 552.

In an example embodiment, curing the formed lens 544 comprises heating the formed lens to a curing temperature. Depending on the chemical structure and/or properties of the lens material, the curing temperature can be a high temperature (e.g., greater than 200 degrees Celsius). Thus, the components mounted within the device housing 802 of the at least partially assembled composite electro-optical device 810 are selected and/or configured to be able to withstand the elevated temperatures and/or UV exposure required for reflowing the lens material and curing the lens material to form the integrated lens 554 from the unshaped lens material 534.

FIG. 8C shows the result of step/operation 468. In particular, FIG. 8C illustrates a couplable electro-optical device 552 comprising an integrated lens 554 adhered to and/or formed onto an pillar 504 formed on the substrate 502. In an example embodiment, the shape of the integrated lens 554 is configured (in accordance with and/or based at least in part on the refractive index of the cured lens material) to focus light incident on the curved surface 556 onto the modeling point 122 (e.g., through the optical window 124 and into the active region of the electro-optical component 504). In an example embodiment, the shape of the integrated lens 554 is configured (in accordance with and/or based at least in part on the refractive index of the cured lens material) to refract light emitted by the active region of the pillar 504 such that the light exiting the curved surface 556 can be approximated by parallel rays.

Continuing with FIG. 4C, at step/operation 470, the remainder of the composite electro-optical device 800 comprising the couplable electro-optical device 552 is assembled. For example, the remainder of the composite electro-optical device 800 is assembled. For example, one or more additional components may be added to the at least partially assembled composite electro-optical device 810 to assemble the composite electro-optical device 800. For example, the composite electro-optical device 800 may be a receiver, transmitter, and/or transceiver. For example, a couplable electro-optical device 552 may be incorporated into a receiver, transmitter, and/or transceiver using passive alignment techniques for aligning the couplable electro-optical device 552 with an optical fiber 300 or other waveguide. For example, a couplable electro-optical device 552 may be incorporated into a receiver, transmitter, and/or transceiver using a secondary lens 200 to passively align the couplable electro-optical device 100 to an optical fiber 300 or other waveguide.

FIG. 9 provides an example schematic diagram of a composite electro-optical device 800 such as a receiver, transmitter, and/or transceiver, comprising a couplable electro-optical device 100 (e.g., formed through a process described by FIG. 4 and one of FIG. 4A, 4B, or 4C). For example, the composite electro-optical device 800 may comprise an optical fiber 300. In various embodiments, the couplable electro-optical device 100 is coupled to the optical fiber 300 using passive alignment. For example, the couplable electro-optical device 100 may be coupled to the optical fiber 300 via secondary lens 200. In various embodiments, one or more secondary lenses 200 may be used to passively align the couplable electro-optical device 100 to the optical fiber 300 in an efficient coupling. In various embodiments, the pillar 504 of the couplable electro-optical device 100 has an optical window that has a diameter less than approximately 40 μm (e.g., 30 μm, 20 μm, and/or the like). In an example embodiment, the optical fiber 300 has a core 304 that has a diameter of less than approximately 10 μm.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for fabricating a couplable electro-optical device, the method comprising:
    fabricating a pillar on a substrate by forming a lens spacer portion about an electro-optical component fabricated on the substrate;
    adhering unshaped lens material to an exposed surface of the pillar, the exposed surface of the pillar being disposed opposite the substrate;
    maintaining the unshaped lens material at a reflow temperature for a reflow time to allow the lens material to reflow into a formed lens shape; and
    curing the lens material to form an integrated lens secured to the electro-optical component on the substrate, wherein the pillar is one of a plurality of pillars formed on the substrate, with each pillar comprising a respective electro-optical component with a lens spacer portion formed thereabout, and the unshaped lens material is adhered to a respective exposed surface of each of the plurality of pillars.

2. The method of claim 1, wherein adhering the unshaped lens material to the exposed surface of the pillar comprises:
coating lens material onto a transfer medium;
applying the lens material to the exposed surface; and
removing the transfer medium to leave the unshaped lens material adhered to the exposed surface.

3. The method of claim 2, wherein the lens material is coated onto the transfer medium using a spin coating process or a block co-polymer technique.

4. The method of claim 2, wherein adhering the lens material to the exposed surface further comprises, after applying the lens material to the exposed surface and before removing the transfer medium, applying pressure to a second surface of the transfer material, wherein the lens material is coated on a first surface of the transfer material and the second surface of the transfer material is opposite the first surface of the transfer material.

5. The method of claim 1, wherein the pillar with the unshaped lens material adhered thereon is mounted to an optical bench during the maintaining of the unshaped lens material at the reflow temperature for the reflow time.

6. The method of claim 5, wherein the optical bench is associated with one or more optical elements configured to mimic the optical path of a composite electro-optical device of which the couplable electro-optical device is configured to be a component.

7. The method of claim 6, wherein at least one of the reflow time or the reflow temperature is determined based on signals generated by one or more sensors coupled to the electro-optical component.

8. The method of claim 5, wherein the curing of the lens material to form the integrated lens secured to the electro-optical component on the substrate is performed while the electro-optical component is mounted to the optical bench.

9. The method of claim 1, further comprising at least partially assembling a composite electro-optical device comprising the electro-optical component disposed within the pillar with the unshaped lens material adhered thereon and performing the maintaining of the unshaped lens material at the reflow temperature for the reflow time while the electro-optical component with the unshaped lens material adhered thereon is disposed within the at least partially assembled composite electro-optical device.

10. The method of claim 9, wherein at least one of the reflow time or the reflow temperature is determined based on signals generated by one or more sensors coupled to the electro-optical component.

11. The method of claim 9, wherein the curing of the lens material to form the integrated lens secured to the electro-optical component on the substrate is performed while the electro-optical component is disposed within the at least partially assembled composite electro-optical device.

12. The method of claim 1, wherein the curing of the lens material comprises heating and/or maintain the lens material at a curing temperature for a curing time.

13. The method of claim 1, wherein the electro-optical component has an optical window diameter of no more than 40 micrometers.

14. The method of claim 1, wherein the couplable electro-optical device is configured to be coupled to an optical fiber having a core diameter in a range of 5 micrometers to 65 micrometers.

15. The method of claim 1, wherein the electro-optical component type is one of a vertical cavity surface-emitting laser (VCSEL) or a photodiode sensor.

16. A method for fabricating a couplable electro-optical device, the method comprising:
fabricating a plurality of pillars on a substrate by forming a plurality of lens spacer portions on the substrate with each lens spacer portion of the plurality of lens spacer portions formed about an electro-optical component of a plurality of electro-optical components fabricated on the substrate, wherein each pillar of the plurality of pillars comprises a respective electro-optical component of the plurality of electro-optical components on the substrate and a respective lens spacer portion of the plurality of lens spacer portions;
applying lens material onto a transfer medium;
applying the lens material to respective exposed surfaces of the plurality of pillars;
removing the transfer medium to leave unshaped lens material adhered to the respective exposed surfaces of the plurality of pillars;
maintaining the unshaped lens material at a reflow temperature for a reflow time to allow the lens material to reflow into respective formed lenses; and
curing the formed lenses to form respective integrated lenses secured to respective ones of the plurality of pillars on the substrate.

17. The method of claim 16, wherein one of:
the pillar, comprising the electro-optical component and the lens spacer portion, with the unshaped lens material adhered thereon is mounted to an optical bench during the maintaining of the unshaped lens material at the reflow temperature for the reflow time, or
the method further comprises at least partially assembling a composite electro-optical device comprising the electro-optical component with the lens material in the unformed lens shape adhered to a respective pillar of the plurality of pillars and performing the maintaining of the lens material at the reflow temperature for the reflow time while the pillar with the lens material adhered thereon is disposed within the at least partially assembled composite electro-optical device.

18. A method for fabricating a couplable electro-optical device, the method comprising:
fabricating a pillar on a substrate by forming a lens spacer portion about an electro-optical component fabricated on the substrate;
adhering unshaped lens material to an exposed surface of the electro-optical component, the exposed surface of the electro-optical component being disposed opposite the substrate;
mounting the electro-optical component with the unshaped lens material adhered thereon to one of (a) an optical bench or (b) an at least partially assembled composite electro-optical device;
maintaining the unshaped lens material at a reflow temperature for a reflow time to allow the lens material to reflow into a shaped lens; and
curing the shaped lens material to form an integrated lens secured to the electro-optical component on the substrate,
wherein the maintaining of the unshaped lens material at the reflow temperature for the reflow time and the curing of the shaped lens is performed while the electro-optical component is disposed within the one of (a) the optical bench or (b) the at least partially assembled composite electro-optical device.

19. The method of claim 18, further comprising applying an anti-reflective coating to an exposed surface of the integrated lens.

20. The method of claim 1, further comprising applying an anti-reflective coating to an exposed surface of the integrated lens.

\* \* \* \* \*